(12) United States Patent
Choi et al.

(10) Patent No.: US 11,829,773 B2
(45) Date of Patent: Nov. 28, 2023

(54) SYSTEMS AND METHODS FOR SECURELY BOOTING A NETWORK DEVICE WITH A SERVICE PROVIDER TRUST ANCHOR

(71) Applicant: Verizon Patent and Licensing Inc., Basking Ridge, NJ (US)

(72) Inventors: Young Rak Choi, Belle Mead, NJ (US); Warren Hojilla Uy, Randolph, NJ (US); Dayong He, Bridgewater, NJ (US); Manuel Enrique Caceres, Basking Ridge, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 295 days.

(21) Appl. No.: 16/899,029

(22) Filed: Jun. 11, 2020

(65) Prior Publication Data

US 2021/0389958 A1    Dec. 16, 2021

(51) Int. Cl.
| | |
|---|---|
| G06F 9/4401 | (2018.01) |
| H04L 9/08 | (2006.01) |
| G06F 21/57 | (2013.01) |
| H04L 9/32 | (2006.01) |

(52) U.S. Cl.
CPC .......... *G06F 9/4416* (2013.01); *G06F 21/572* (2013.01); *H04L 9/0825* (2013.01); *H04L 9/0894* (2013.01); *H04L 9/3236* (2013.01)

(58) Field of Classification Search
CPC ... G06F 9/4416; G06F 21/572; H04L 9/0825; H04L 9/0894; H04L 9/3236
USPC .......................................................... 713/2
See application file for complete search history.

(56) References Cited

U.S. PATENT DOCUMENTS

| | | | | |
|---|---|---|---|---|
| 8,239,686 B1* | 8/2012 | Hodzic | ................... | G06F 21/52 |
| | | | | 713/187 |
| 10,990,759 B1* | 4/2021 | Sosonkin | ............... | H04L 9/3239 |
| 2007/0192610 A1* | 8/2007 | Chun | .................... | G06F 21/575 |
| | | | | 713/176 |
| 2007/0300207 A1* | 12/2007 | Booth | ................... | G06F 21/575 |
| | | | | 717/124 |
| 2011/0113181 A1* | 5/2011 | Piwonka | .................. | G06F 8/65 |
| | | | | 711/E12.007 |
| 2013/0320079 A1* | 12/2013 | Nordin | ............... | G06Q 10/0832 |
| | | | | 235/375 |
| 2018/0032734 A1* | 2/2018 | Gunti | ..................... | G06F 21/575 |
| 2020/0334360 A1* | 10/2020 | Inaba | .................... | G06F 21/575 |
| 2021/0067377 A1* | 3/2021 | Beck | .................... | H04L 9/0891 |

(Continued)

*Primary Examiner* — Moeen Khan

(57) ABSTRACT

A network device may load, via a boot ROM application, a provider bootloader application from a memory of the network device and may calculate a first hash value based on decrypting a provider bootloader signature with a provider public key. The network device may calculate a second hash value based on the provider bootloader application and may utilize, when the first hash value and the second hash value are equivalent, the provider bootloader application to load an original equipment manufacturer (OEM) bootloader application from the memory. The network device may calculate a third hash value based on decrypting an OEM bootloader signature with one of a plurality of OEM public keys. The network device may calculate a fourth hash value based on the OEM bootloader application. The network device may complete, when the third hash value and the fourth hash value are equivalent, a boot process for the network device.

20 Claims, 17 Drawing Sheets

(56) References Cited

U.S. PATENT DOCUMENTS

2022/0014353 A1\* 1/2022 Lim .................. H04W 4/80
2022/0217002 A1\* 7/2022 Karam ............... H04L 9/3263

\* cited by examiner

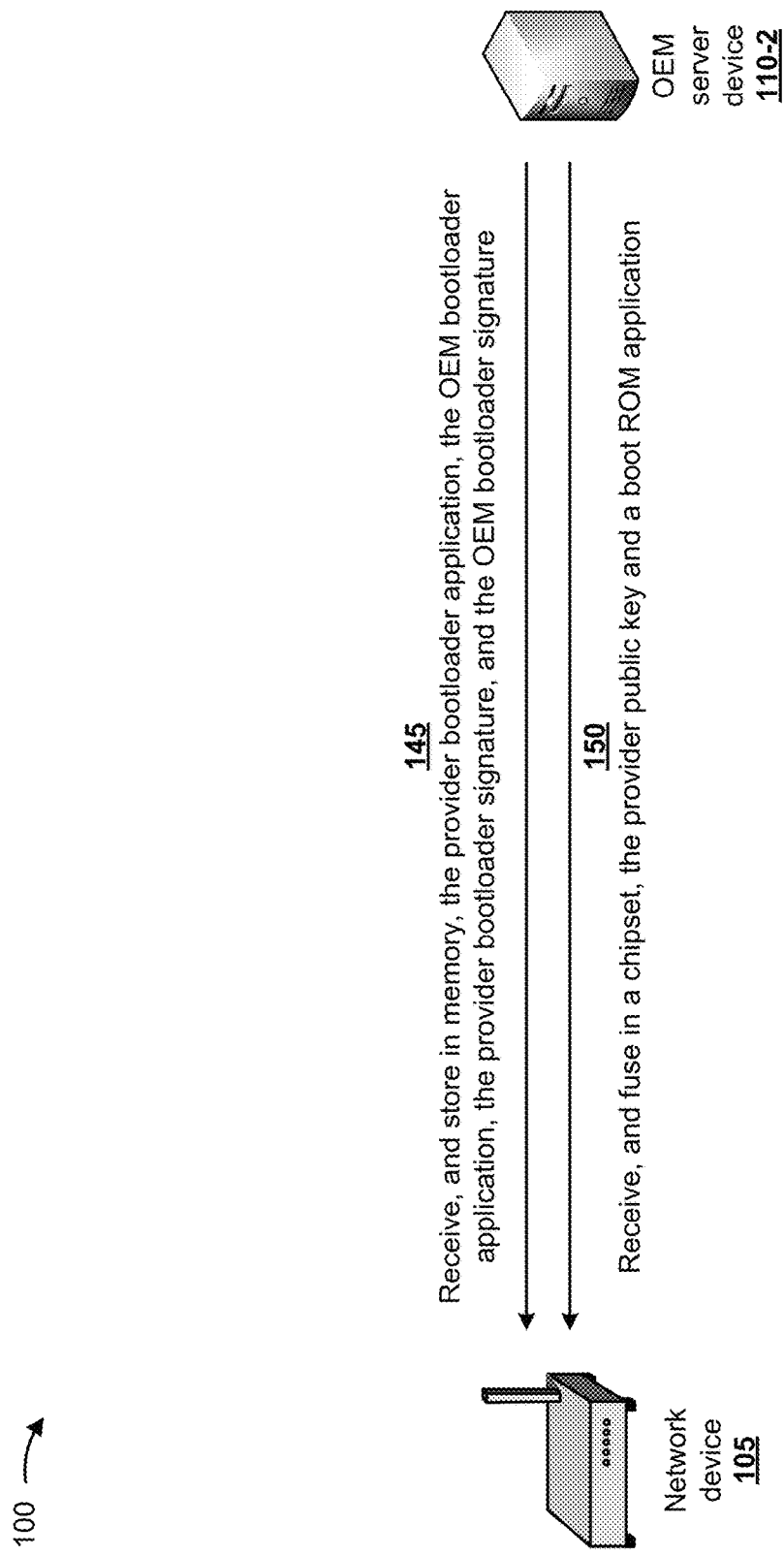

US 11,829,773 B2

SYSTEMS AND METHODS FOR SECURELY BOOTING A NETWORK DEVICE WITH A SERVICE PROVIDER TRUST ANCHOR

BACKGROUND

A network device provides an access point for endpoint devices to access a network, such as the internet and/or a private network. The network device may have one or more settings that affect how the network device communicates with the endpoint devices and/or how the endpoint devices access the network.

DETAILED DESCRIPTION OF PREFERRED EMBODIMENTS

Figure 1A:
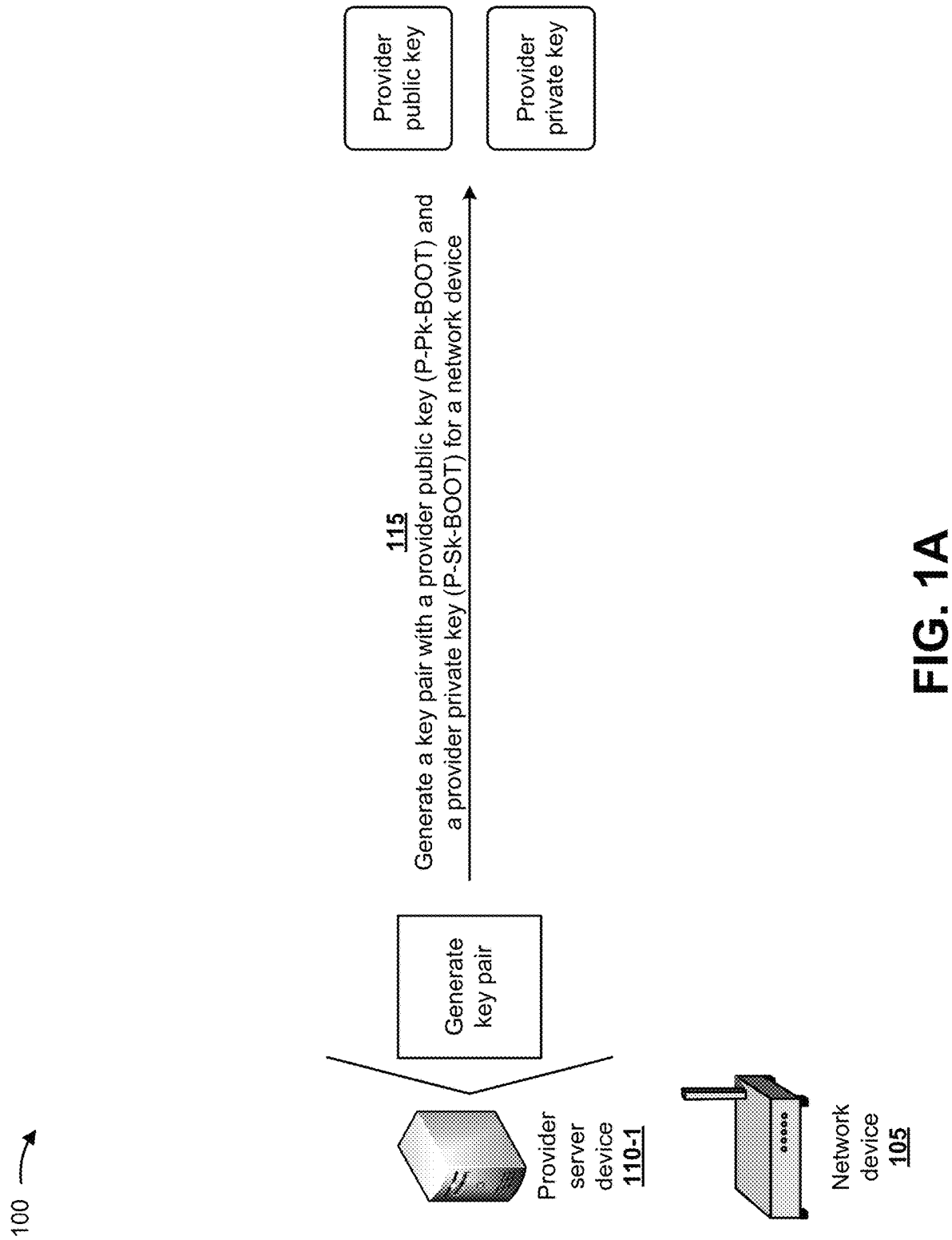
FIGS. 1A-1N are diagrams of an example implementation described herein.

The following detailed description of example implementations refers to the accompanying drawings. The same reference numbers in different drawings may identify the same or similar elements.

A network device, such as a router or other customer premises equipment (CPE), may provide a connection to a network, such as the Internet and/or a private network, for an endpoint device, such as a user device. The network device may have a "secure boot" functionality that allows only authorized firmware to be loaded and run on the network device. For example, when the network device is manufactured, a public key (also referred to as a trust anchor) and a boot application may be fused to a chipset (e.g., a read only memory (ROM)) of the network device. An original equipment manufacturer (OEM) server device may send to the network device an OEM bootloader application (e.g., that includes firmware) that has been signed using a private key that corresponds to the public key. The network device, using the boot application, may verify the OEM bootloader application using the public key. For example, the network device may obtain a first hash value associated with the OEM bootloader application by decrypting the signature of the OEM bootloader application and may use a hash function on the OEM bootloader application to obtain a second hash value. The network device may determine that the first hash value is the same as the second hash value and that therefore the OEM bootloader application is verified (e.g., the OEM bootloader application is associated with an authorized party) and may therefore load and/or install the OEM bootloader application.

Typically, the public key and the private key are generated by the OEM server device. When one OEM manufactures the network device, including the public key generated by the OEM server device in the chipset of the network device is straightforward. However, in many cases, when multiple OEMs provide multiple components for manufacturing the network device, it is not practical to include each respective public key associated with the multiple OEMs in the chipset of the network device. This may prevent the network device from being able to verify a particular OEM bootloader application associated with a particular component of the network device, which may prevent the network device from installing firmware that allows and/or improves a performance (e.g., a computing performance, a networking performance, and/or the like) of the network device.

Some implementations described herein provide a network device that executes a boot ROM application to load a provider bootloader application from a memory of the network device. The provider bootloader application may include one or more OEM public keys associated with OEMs that provided one or more components of the network device. The network device may calculate a first hash value based on decrypting a provider bootloader signature with a provider public key (e.g., a single public key included in the chipset of the network device). The network device may calculate a second hash value based on the provider bootloader application and may verify, when the first hash value and the second hash value are equivalent, that the provider bootloader application is authorized to run on the network device.

Moreover, in some implementations, the provider bootloader application may load an OEM bootloader application (of a plurality of OEM bootloader applications) from the memory of the network device. The network device may calculate a third hash value based on decrypting an OEM bootloader signature with one of the plurality of OEM public keys included in the provider bootloader application. The network device may calculate a fourth hash value based on the OEM bootloader application and may verify that the OEM bootloader application is authorized to run on the network device. Accordingly, the network device may complete a boot process for the network device by running the OEM bootloader application.

In this way, the network device allows for multiple OEM bootloader applications to be verified and run on the network device using only a single public key (e.g., the provider public key) that is included in the chipset of the network device. Accordingly, the network device is able to verify firmware or other applications associated with an OEM public key that is included in the provider bootloader application. This may allow the network device to load and/or install firmware or other applications that the network device would have otherwise discarded and/or ignored, which may allow and/or improve a performance (e.g., a computing performance, a networking performance, and/or the like) of the network device.

While some implementations described herein are directed to a network device performing one or more processing steps described herein to load and/or install firmware or other applications on the network device, additional contemplated implementations include implementations directed to other devices, such as an endpoint device, a user device, a server device, and/or the like performing one or more or more of the processing steps described herein to load and/or install firmware or other applications on the other devices.

Figure 1B:
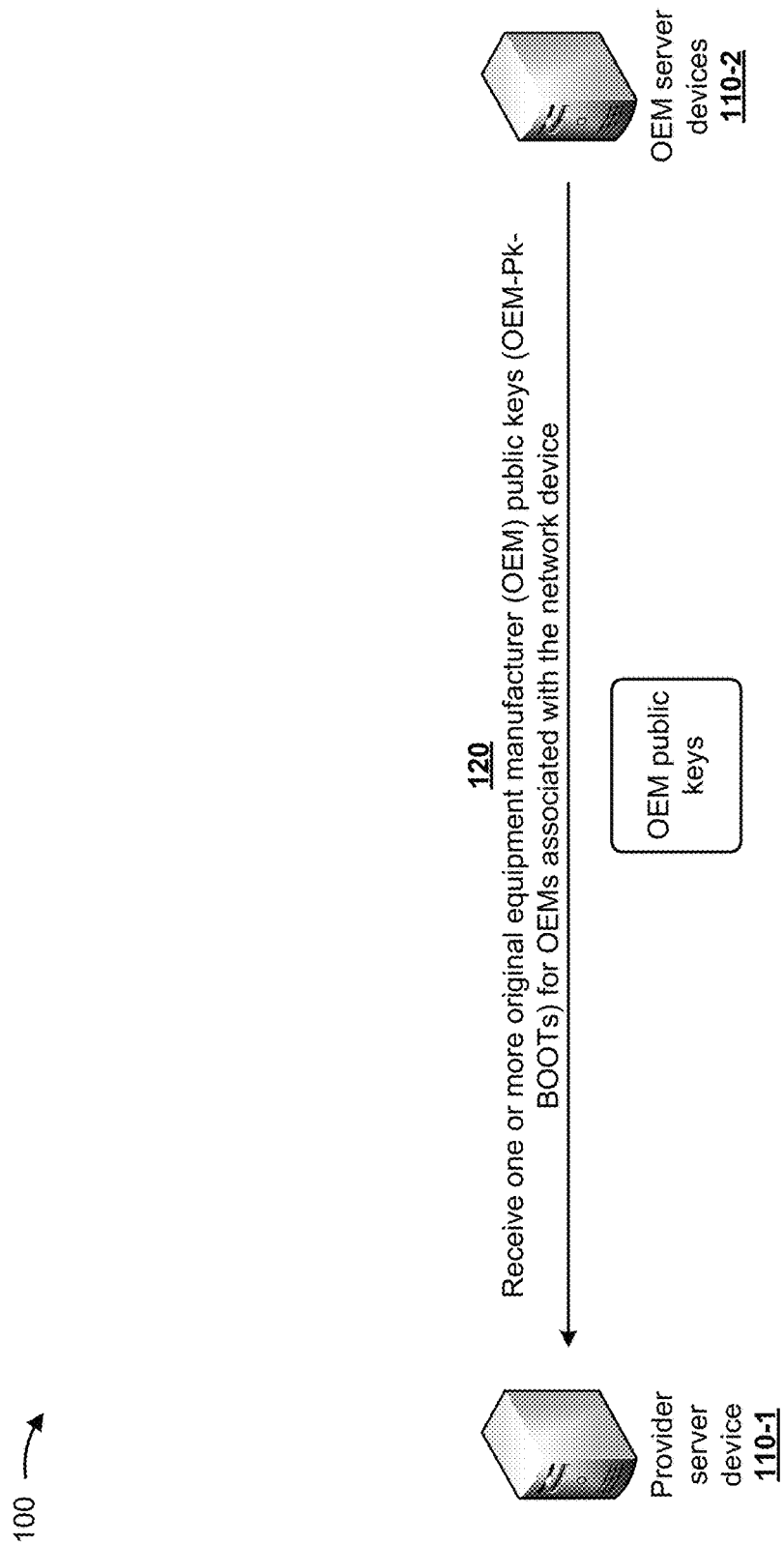
Figure 1C:
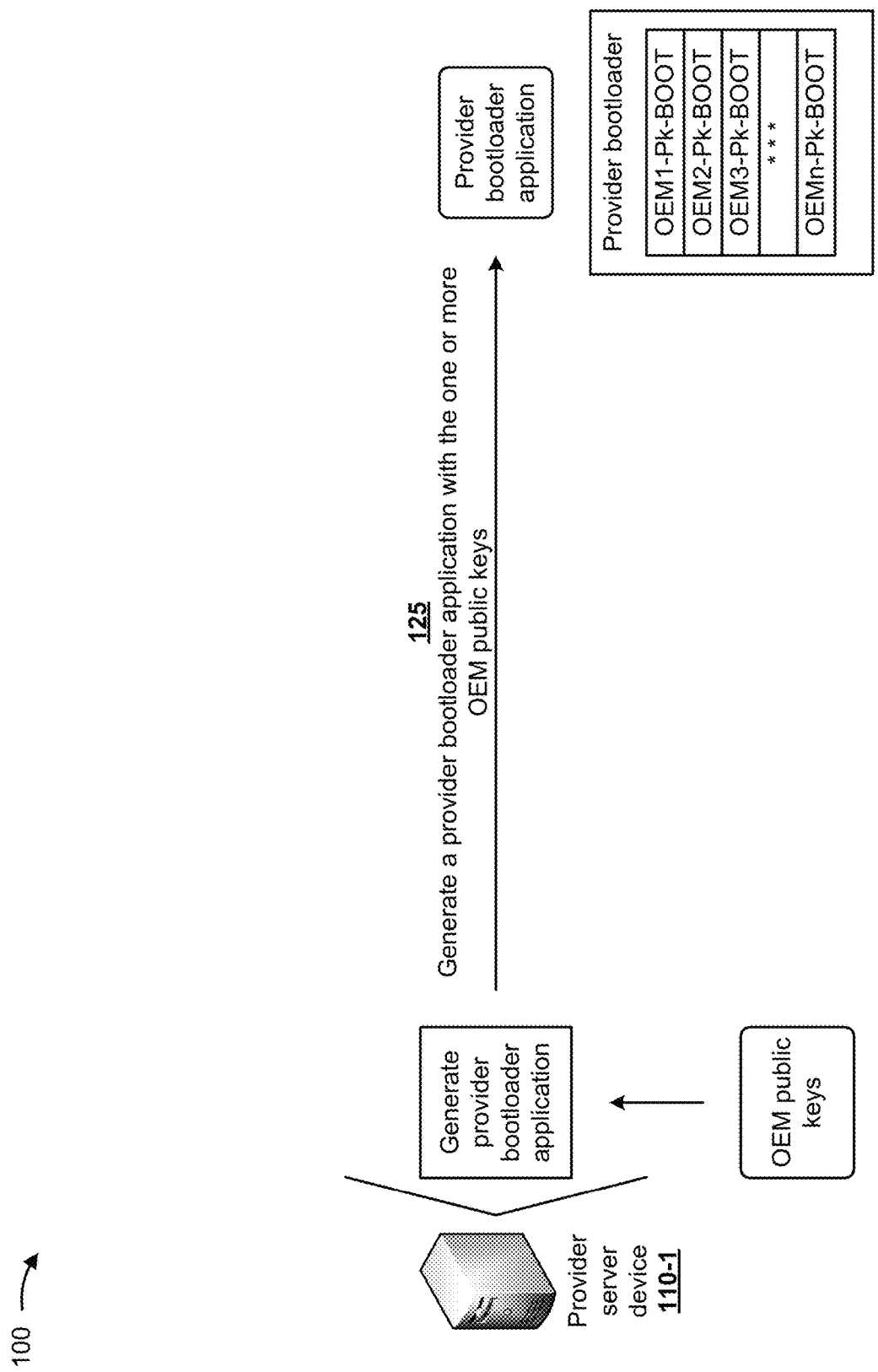
Figure 1D:
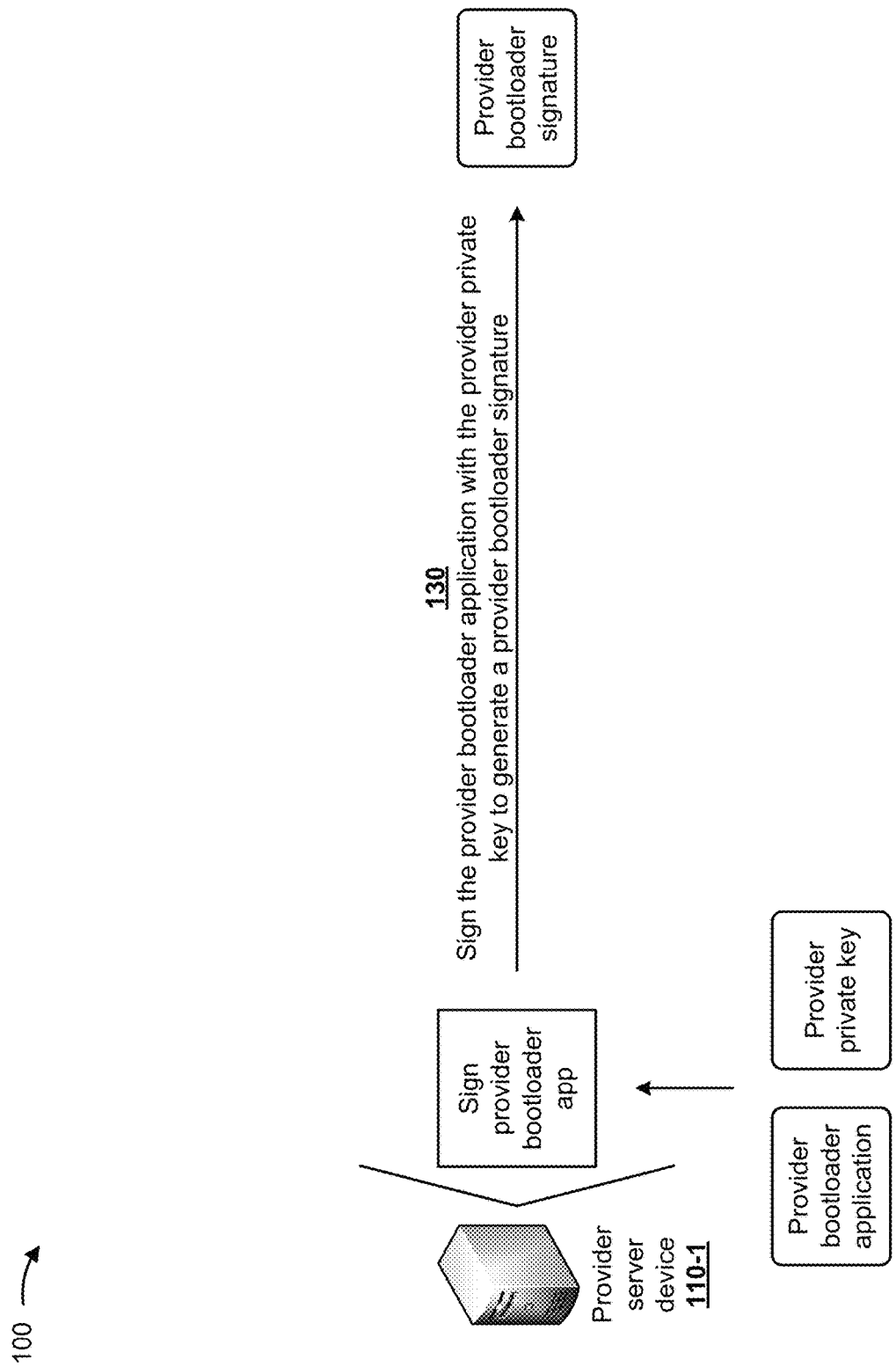
Figure 1E:
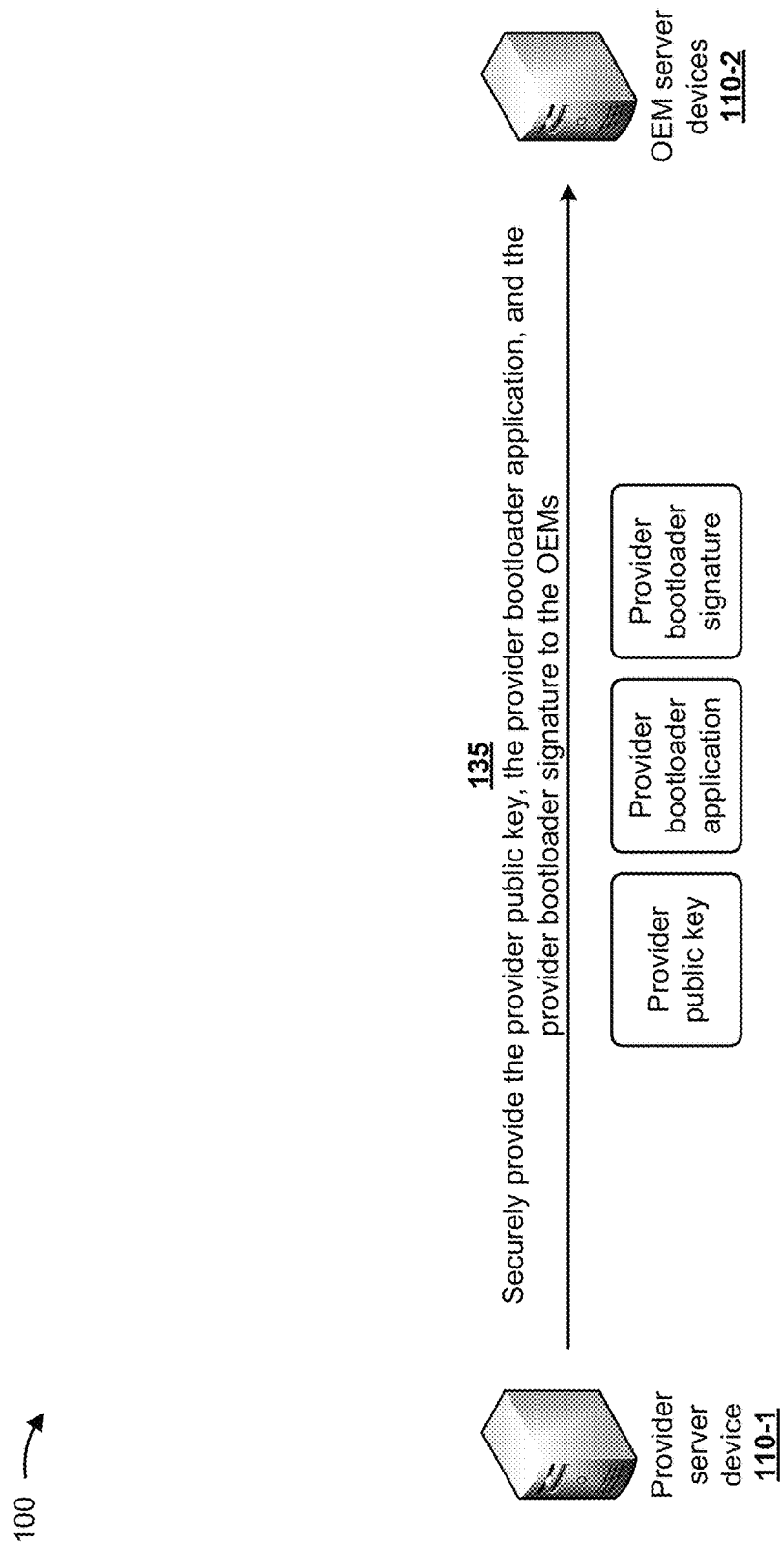
Figure 1F:
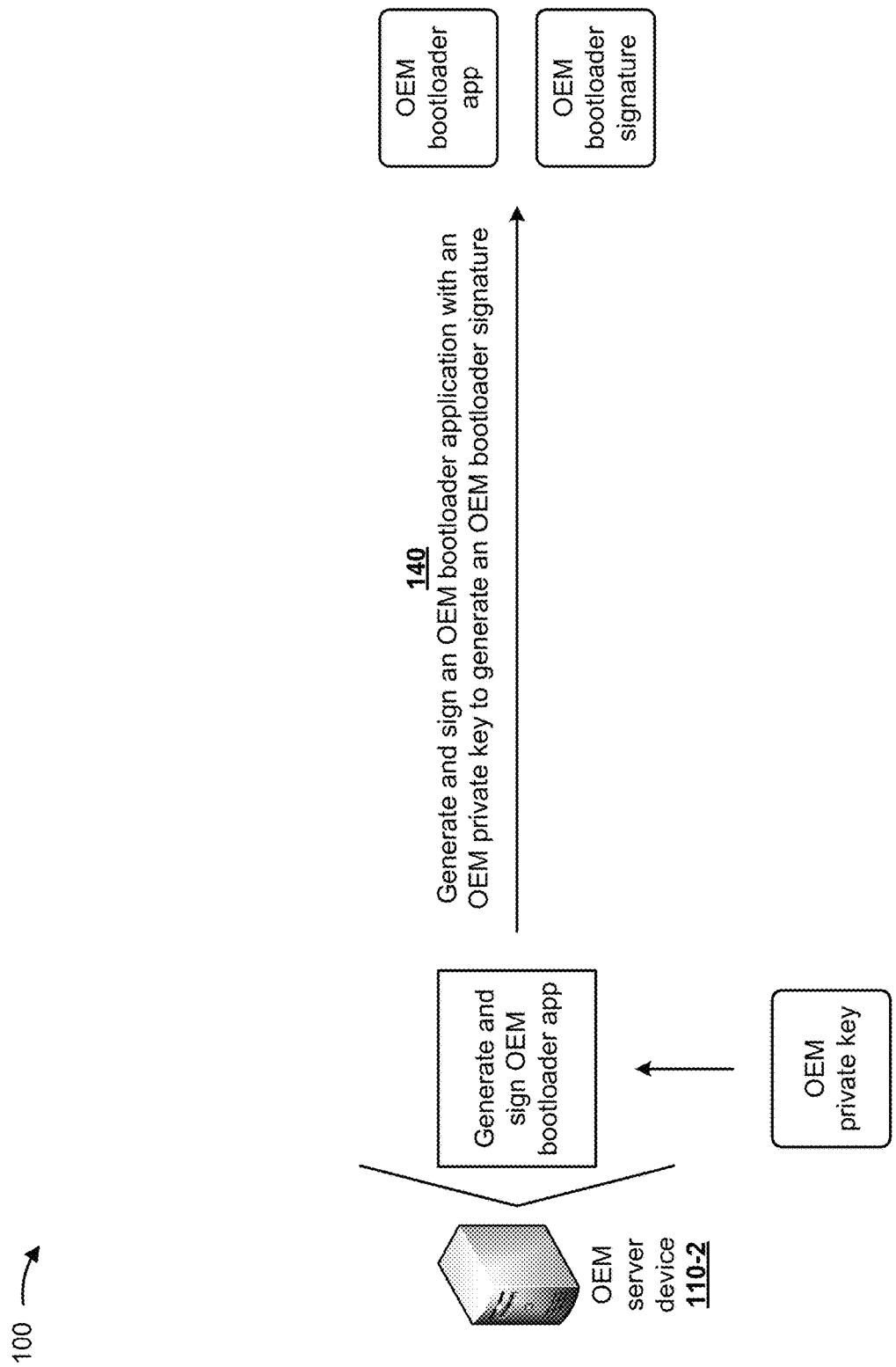
Figure 1H:
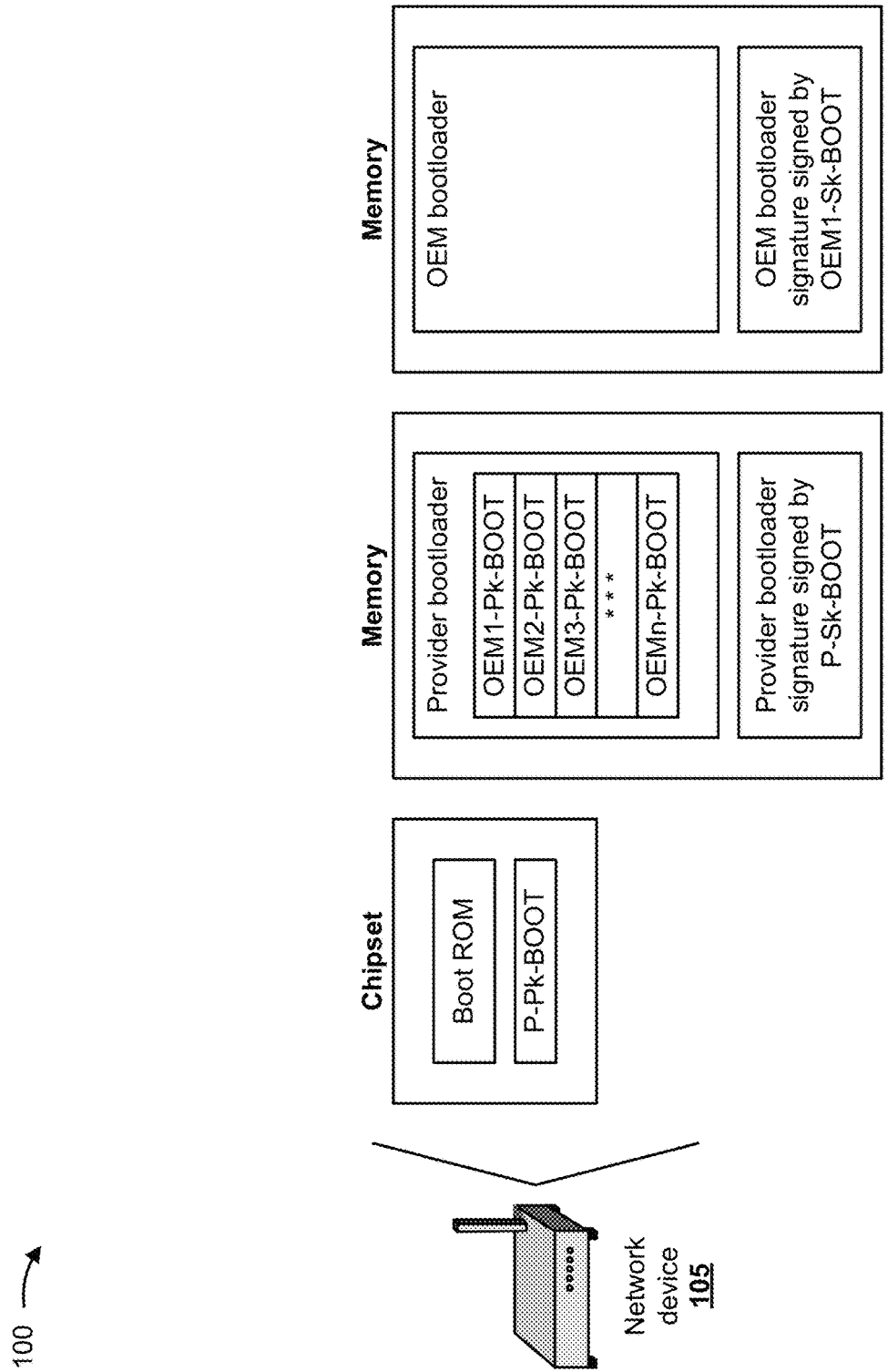
Figure 1I:
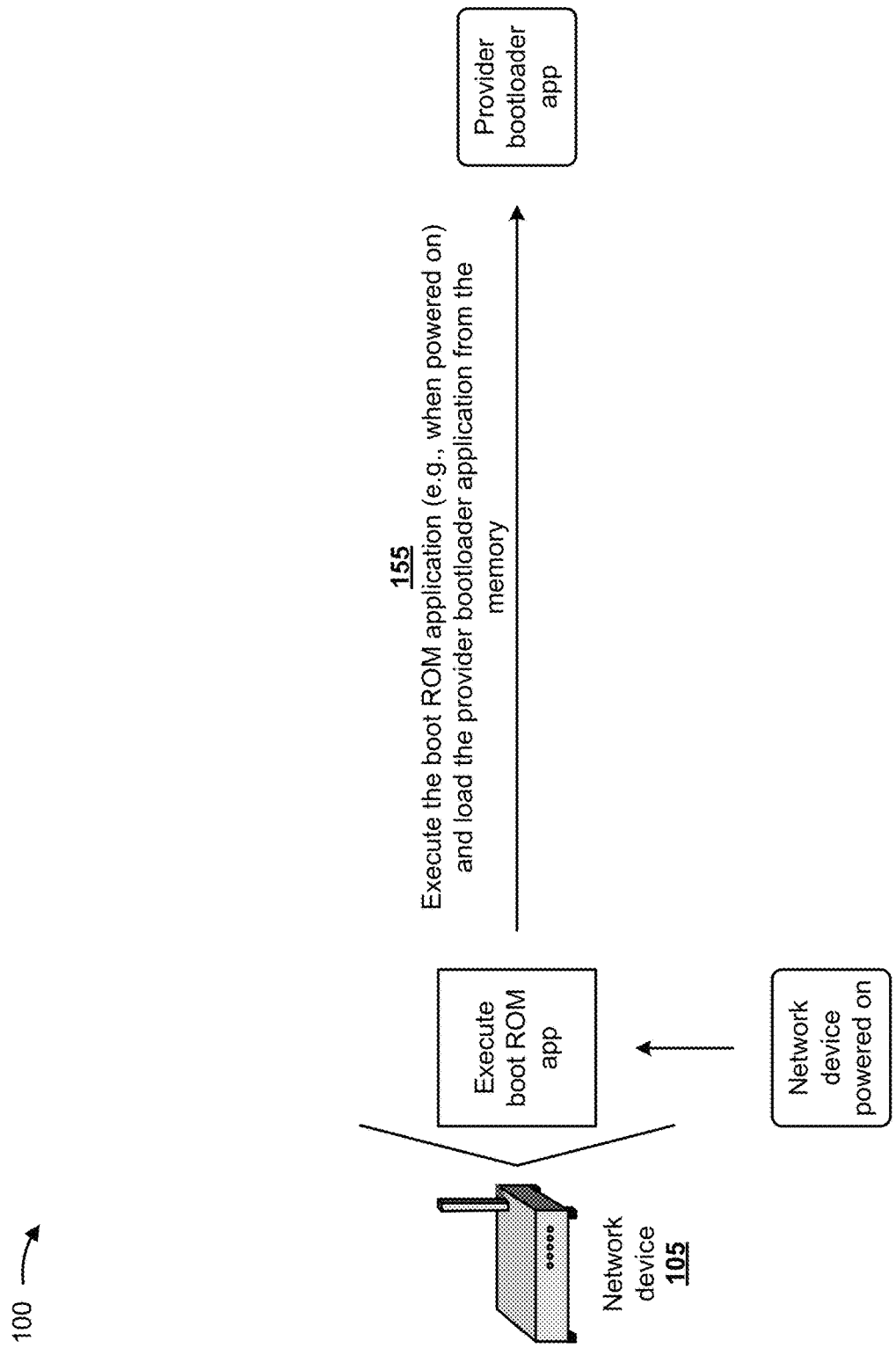
Figure 1J:
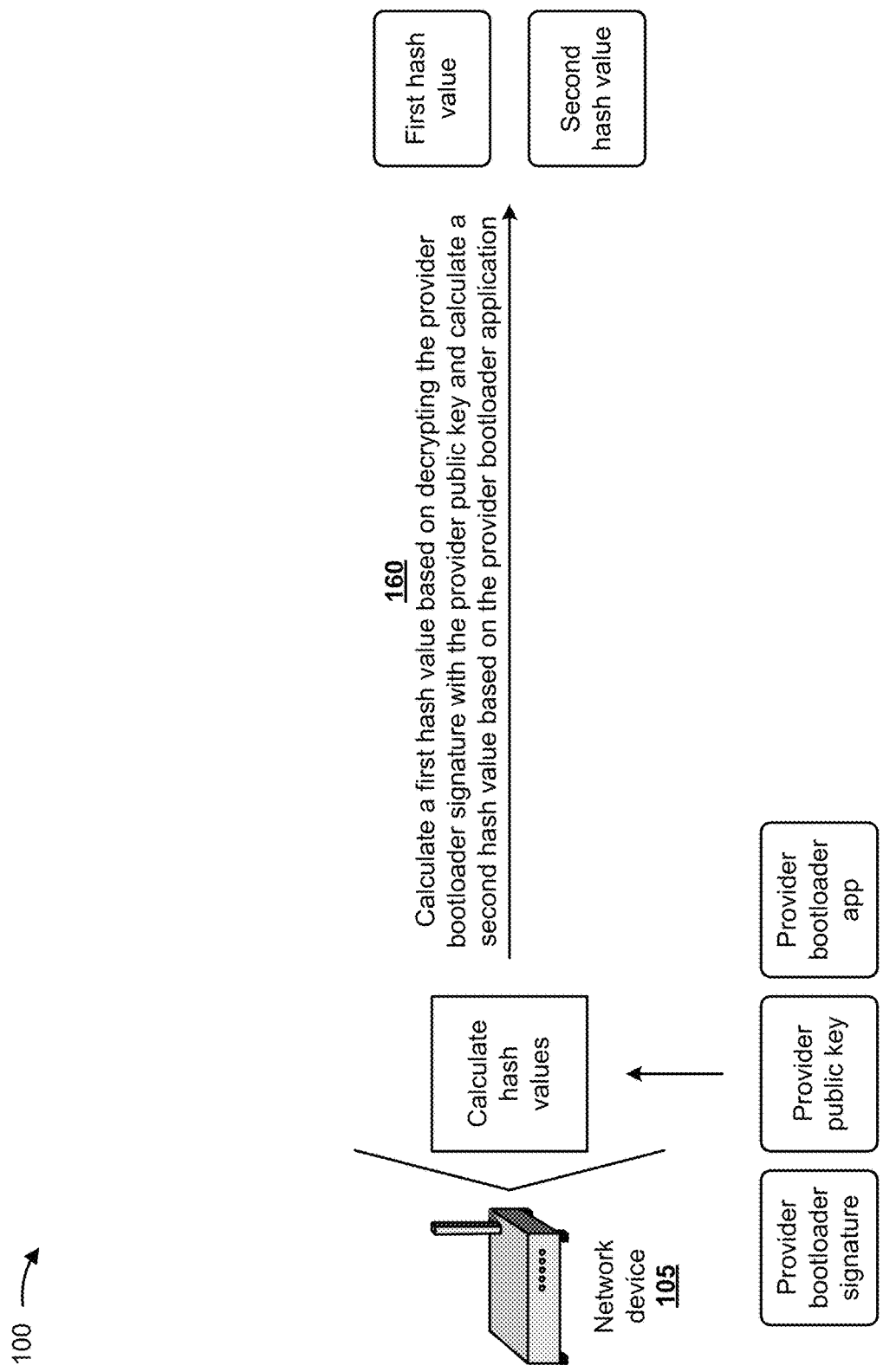
Figure 1K:
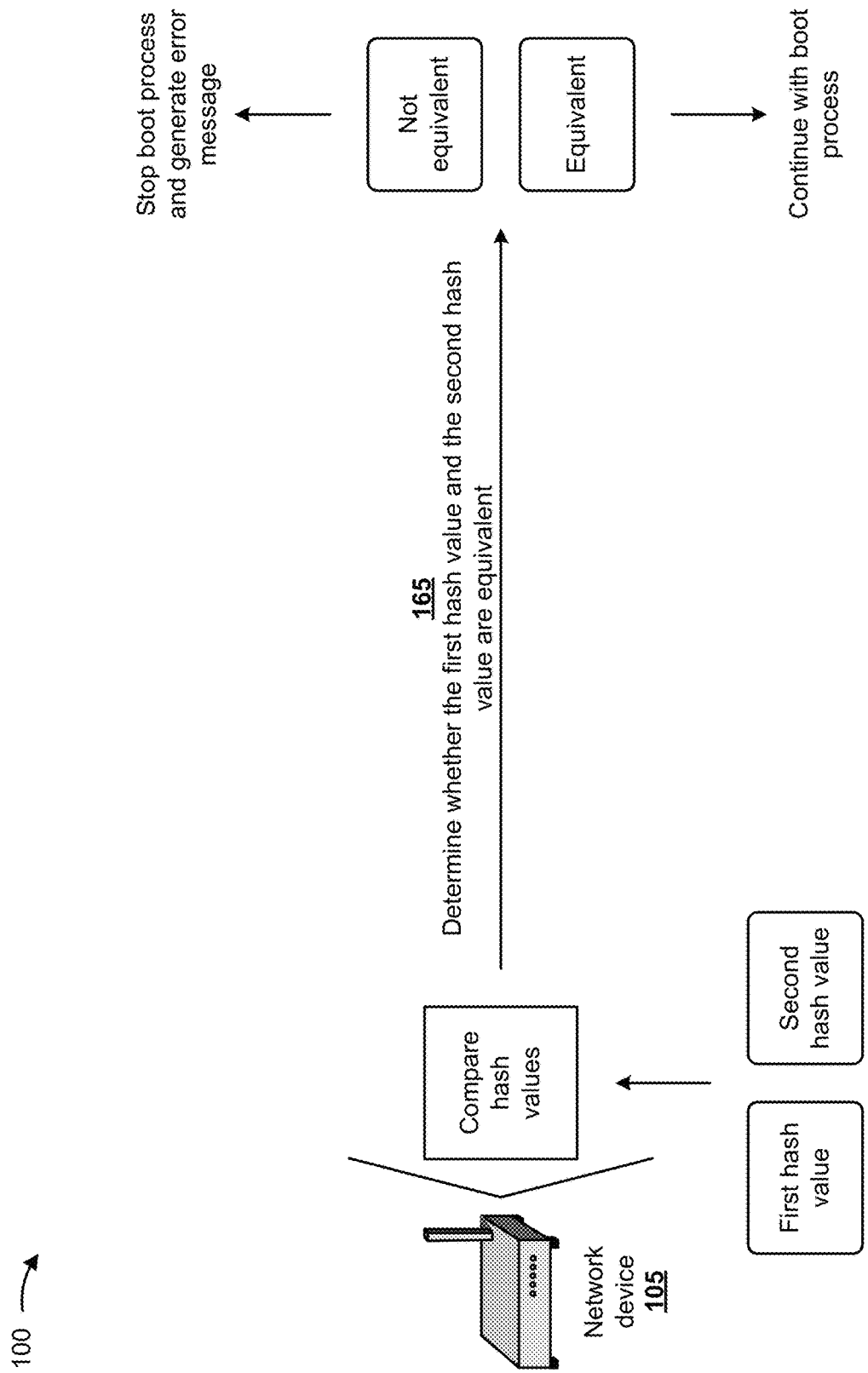
Figure 1L:
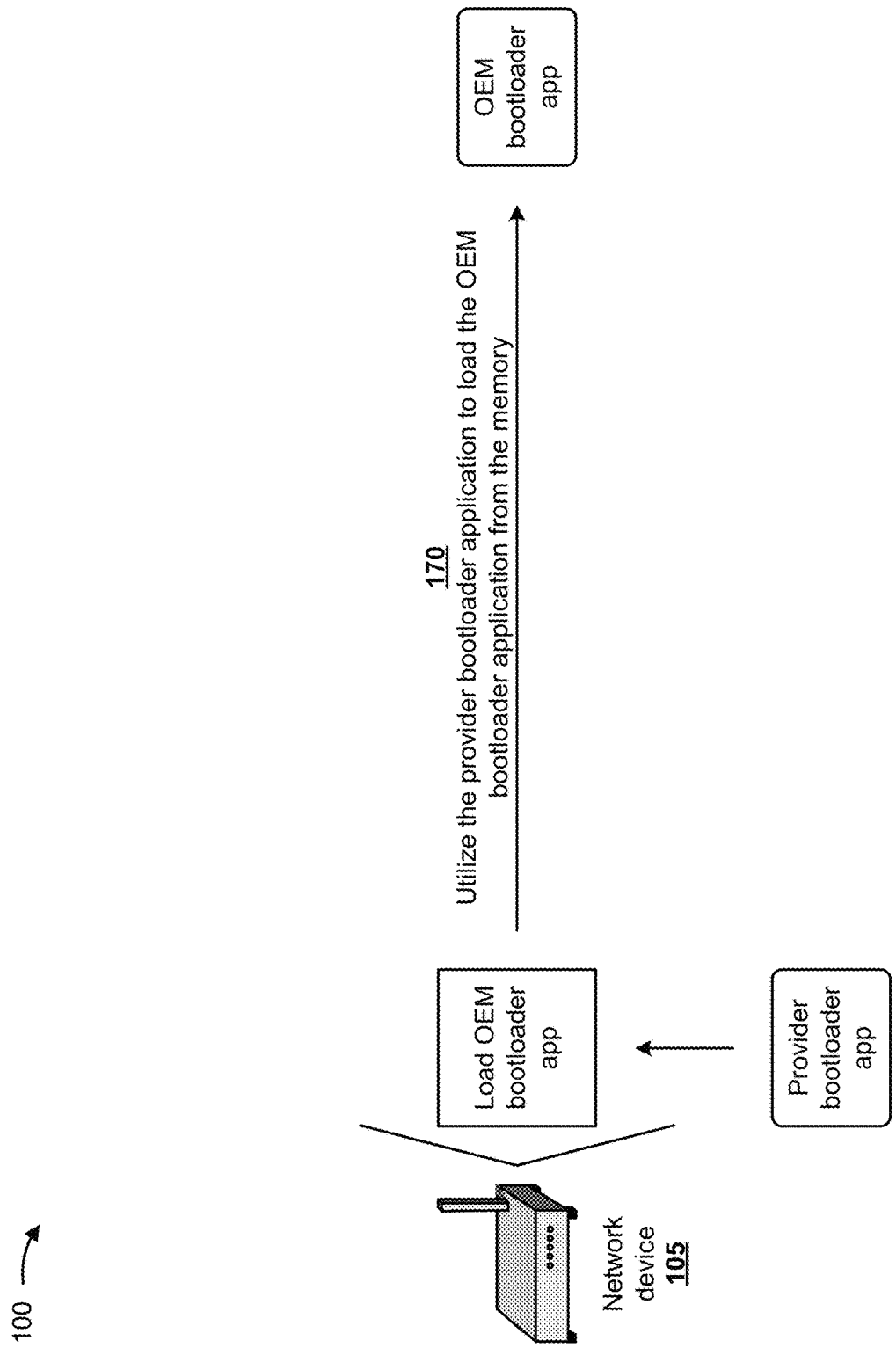
Figure 1M:
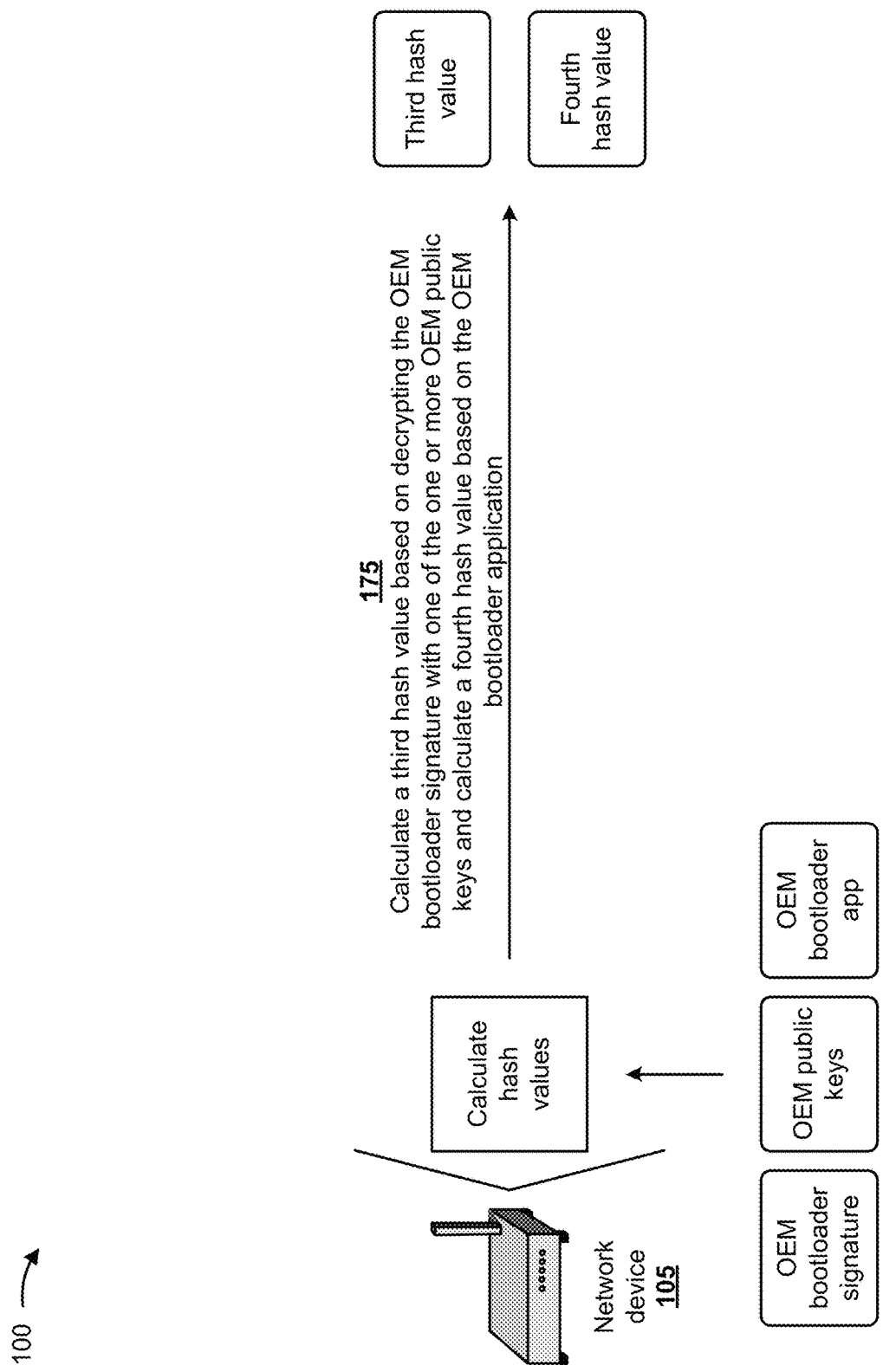
Figure 1N:
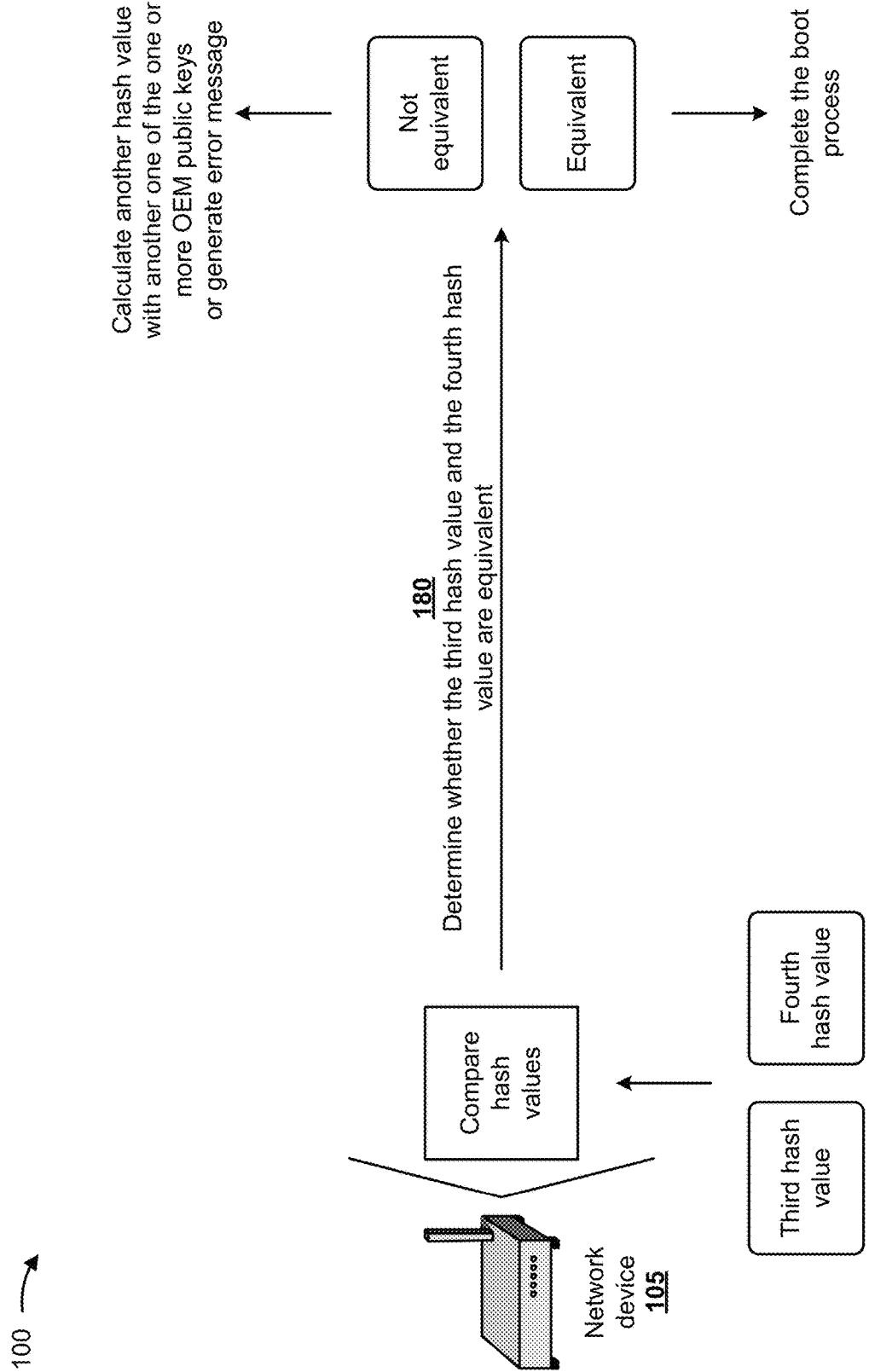

FIGS. 1A-1N are diagrams of an example 100 associated with securely booting a network device with a service provider trust anchor. As shown in FIGS. 1A-1N, example 100 includes a network device 105 and a plurality of server devices 110, such as provider server device 110-1 and one or more OEM server devices 110-2. The network device 105 may be a router, a CPE, and/or the like that provides access to a network (e.g., the Internet) to a user device. The provider server device 110-1 may be associated with an organization that provides the network device 105 to a user of the network device 105 (e.g., a network service provider). The one or more OEM server devices 110-2 may be associated with respective OEMs that are associated with the network device 105. For example, the one or more OEMs may be manufacturers of one or more components of the network device 105, providers of one or more applications (e.g., one or more firmware applications) of the network device 105, and/or the like.

As shown in FIG. 1A, and by reference number 115, the provider server device 110-1 may generate a key pair for network device 105. For example, the provider server device 110-1 may generate a provider public key (P-Pk-BOOT) and a provider private key (P-Sk-BOOT). The provider private key may be securely stored in a memory of the provider server device 110-1. As described herein, the network device 105 may use the provider public key to verify a provider bootloader application when the provider bootloader application is signed using the provider private key.

Additionally, or alternatively, each of the one or more OEM server devices 110-2 may generate a key pair that comprises an OEM public key (OEM-Pk-BOOT) and an OEM private key (OEM-Sk-BOOT). An OEM private key may be securely stored in a respective memory of each OEM server device 110-2. As described herein, the network device 105 may use an OEM public key to verify an OEM bootloader application when the OEM bootloader application is signed using a corresponding OEM private key.

In some implementations, an OEM server device (referred to individually as OEM server device 110-2), of the one or more OEM server devices 110-2, may send an OEM public key generated by the OEM server device 110-2 to the provider server device 110-1. For example, the provider server device 110-1 and the OEM server device 110-2 may establish a communication session to allow the OEM server device 110-2 to send the OEM public key generated by the OEM server device 110-2 to the provider server device 110-1. In this way, as shown in FIG. 1B, and by reference number 120, the provider server device 110-1 may receive, from the one or more OEM server devices 110-2, one or more OEM public keys (OEM-Pk-BOOTs)

As shown in FIG. 1C, and by reference number 125, the provider server device 110-1 may generate a provider bootloader application (e.g., that is configured to be run by the network device 105 to allow the network device 105 to load and run an OEM bootloader application described herein). In some implementations, the provider server device 110-1 may generate the provider bootloader application to include the one or more OEM public keys (e.g., that were received from the one or more OEM server devices 110-2). For example, as shown in FIG. 1C, the provider bootloader application may include OEM public keys OEM1-Pk-BOOT through OEMn-PK-BOOT, where n≥1.

As shown in FIG. 1D, and by reference number 130, the provider server device 110-1 may sign the provider bootloader application (e.g., that includes the one or more OEM public keys) with the provider private key to generate a provider bootloader signature (e.g., for the provider bootloader application). For example, the provider server device 110-1 may process the provider bootloader application using a cryptographic hash function to generate a provider bootloader hash value. The provider server device 110-1 may encrypt the provider bootloader hash value using the provider private key to generate the provider bootloader signature.

As shown in FIG. 1E, and by reference number 135, the provider server device 110-1 may send the provider public key, the provider bootloader application, and the provider bootloader signature to the one or more OEM server devices 110-2. For example, the provider server device 110-1 and an OEM server device 110-2 of the one or more OEM server devices 110-2 may establish (or reestablish) a communication session to allow the provider server device 110-1 to send the provider public key, the provider bootloader application, and the provider bootloader signature to the OEM server device 110-2. Accordingly, the provider server device 110-1 may securely provide the provider public key, the provider bootloader application, and the provider bootloader signature to the one or more OEM server devices 110-2.

As shown in FIG. 1F, and by reference number 140, an OEM server device 110-2, of the one or more OEM server devices 110-2, may generate an OEM bootloader application. The OEM bootloader application may include executable code, such as firmware, that is configured to be run by network device 105 (e.g., to initialize one or more components of the network device 105, to control the one or more components, and/or the like). In some implementations, the OEM server device 110-2 may sign the OEM bootloader application with the OEM private key to generate an OEM bootloader signature (e.g., for the OEM bootloader application). For example, the OEM server device 110-2 may process the OEM bootloader application using a cryptographic hash function to generate an OEM bootloader hash value. The OEM server device 110-2 may encrypt the OEM bootloader hash value using the OEM private key to generate the OEM bootloader signature. In this way, each OEM server device 110-2, of the one or more OEM server devices 110-2, may generate and sign an OEM bootloader application with an OEM private key to generate an OEM bootloader signature.

As shown in FIG. 1G, and by reference number 145, an OEM server device 110-2, of the one or more OEM server devices 110-2, may send the provider bootloader application, the provider bootloader signature, an OEM bootloader application generated by the OEM server device 110-2, and/or an OEM bootloader signature generated by the OEM server device 110-2 to the network device 105. For example, the OEM server device 110-2 and the network device 105 may establish a communication session to allow the OEM server device 110-2 to send the provider bootloader application, the provider bootloader signature, the OEM bootloader application, and the OEM bootloader signature to the network device 105. In some implementations, the network device 105 may store the provider bootloader application, the provider bootloader signature, the OEM bootloader application, and the OEM bootloader signature in memory, such as flash memory, of the network device 105.

As further shown in FIG. 1G, and by reference number 150, the OEM server device 110-2 may send the provider public key and a boot read only memory (ROM) application to the network device 105 (e.g., via the communication session between the OEM server device 110-2 and the network device 105). The boot ROM application may be an application to load bootloader applications on the network device 105, such as the provider bootloader application, the OEM bootloader application, and/or the like. In some implementations, the network device 105 may fuse the provider public key and the boot ROM application in a chipset of the network device 105. For example, the network device 105 may cause the provider public key and the boot ROM application to be loaded and/or stored in a chipset (e.g., a ROM) of the network device 105. Alternatively, when the network device 105 is manufactured (e.g., when the one or more components of the network device 105 are assembled to create the network device 105), a chipset may be installed in the network device 105 that includes (e.g., is preloaded with) the provider public key and the boot ROM application. Accordingly, when the provider public key is fused in the chipset, the provider public key is a trust anchor of the network device 105.

FIG. 1H shows that the provider public key (P-Pk-BOOT) and the boot ROM may be stored and/or included in a memory (e.g., a one-time-programmable memory) in the chipset of the network device 105. FIG. 1H further shows that the provider bootloader application (e.g., that includes the one or more OEM public keys OEM1-Pk-BOOT through OEMn-PK-BOOT) and the provider bootloader signature (encrypted by P-Sk-BOOT) may be stored in the memory (e.g., flash memory) of the network device 105. FIG. 1H additionally shows that the OEM bootloader application and the OEM bootloader signature (e.g., OEM1-Sk-BOOT associated with OEM1-Pk-BOOT) may be stored in the memory of the network device 105.

As shown in FIG. 1I, and by reference number 155, the network device 105 may execute the boot ROM application. For example, the network device 105 may execute the boot ROM application when the network device 105 powers on (e.g., the network device 105 may execute the boot ROM application as part of a power-on initiation process of the network device 105). In some implementations, executing the boot ROM application may cause the network device 105 to load the provider bootloader application from the memory of the network device 105 (e.g., retrieve the provider bootloader application from the memory).

As shown in FIG. 1J, and by reference number 160, the network device 105 may process the provider bootloader signature to calculate a first hash value. For example, the network device 105 may decrypt the provider bootloader signature with the provider public key to determine the first hash value (e.g., that may be the provider bootloader hash value generated by the provider server device 110-1, as described herein in relation to FIG. 1D). Additionally, or alternatively, the network device 105 may calculate a second hash value based on the provider bootloader application. For example, the network device 105 may process the provider bootloader application using a cryptographic hash function (e.g., the same cryptographic hash function that the provider server device 110-1 used to generate the provider bootloader signature, as describe herein in relation to FIG. 1D) to generate the second hash value.

As shown in FIG. 1K, and by reference number 165, the network device 105 may determine whether the first hash value and the second hash value are equivalent. For example, the network device 105 may determine whether the first hash value matches the second hash value (e.g., that the first hash value and the second hash value are the same). When the first hash value and the second hash value are not equivalent, the network device 105 may cease the boot process for the network device 105. For example, the network device 105 may cease running the boot ROM application, may cause the provider bootloader application and/or the OEM bootloader application to be removed (e.g., discarded, deleted, and/or the like) from the memory of the network device 105, and/or the like. In some implementations, when the first hash value and the second hash value are not equivalent, the network device 105 may generate an error message (e.g., indicating that the provider bootloader application has not been verified). The network device 105 may send the error message to another device, such as a user device associated with the network device 105, to allow the error message to be displayed on a display screen of the other device.

Alternatively, when the first hash value and the second hash value are equivalent, the network device 105 may continue with the boot process for the network device 105. For example, the network device 105 may perform one or more of the processing steps described herein in association with FIG. 1L-1N.

As shown in FIG. 1L, and by reference number 170, the network device 105 may utilize the provider bootloader application to load the OEM bootloader application from the memory. For example, the network device 105 may execute the provider bootloader application, which may cause the network device 105 to load the OEM bootloader application from the memory of the network device 105 (e.g., retrieve the OEM bootloader application from the memory).

As shown in FIG. 1M, and by reference number 175, the network device 105 may process the OEM bootloader signature to calculate a third hash value. For example, the network device 105 may decrypt the OEM bootloader signature with an OEM public key of the one or more OEM public keys (e.g., that are included in the provider bootloader application) to determine the third hash value (e.g., that may be the OEM bootloader hash value generated by an OEM server device 110-2, as described herein in relation to FIG. 1F). Additionally, or alternatively, the network device 105 may calculate a fourth hash value based on the OEM bootloader application. For example, the network device 105 may process the OEM bootloader application using a cryptographic hash function (e.g., the same cryptographic hash function that the OEM server device 110-2 used to generate the OEM bootloader signature, as describe herein in relation to FIG. 1F) to generate the fourth hash value.

As shown in FIG. 1N, and by reference number 180, the network device 105 may determine whether the third hash value and the fourth hash value are equivalent. For example, the network device 105 may determine whether the third hash value matches the fourth hash value (e.g., that the third hash value and the fourth hash value are the same). When the third hash value and the fourth hash value are equivalent, the network device 105 may complete the boot process for the network device 105. For example, the network device 105 may initialize one or more components of the network device 105, may install one or more applications (e.g., that may include firmware) of the network device 105, and/or the like.

Alternatively, when the third hash value and the fourth hash value are not equivalent, the network device 105 may perform one or more actions. In some implementations, the one or more actions include ceasing the boot process of the network device 105. For example, the network device 105 may cease running the boot ROM application and/or the provider bootloader application, may cause the provider bootloader application and/or the OEM bootloader application to be removed (e.g., discarded, deleted, and/or the like) from the memory of the network device 105, and/or the like.

In some implementations, the one or more actions include generating an error message (e.g., indicating that the OEM bootloader application has not been verified). The network device 105 may send the error message to another device, such as the user device associated with the network device 105, to allow the error message to be displayed on a display screen of the other device.

In some implementations, the one or more actions include processing the OEM bootloader signature to calculate a fifth hash value. For example, the network device 105 may decrypt the OEM bootloader signature with another OEM public key of the one or more OEM public keys to determine the fifth hash value. Accordingly, the network device 105 may determine whether the fifth hash value and the fourth hash value are equivalent. When the fifth hash value and the fourth hash value are equivalent, the network device 105 may complete the boot process for the network device 105.

When the fifth hash value and the fourth hash value are not equivalent, the network device 105 may cease the boot process for the network device 105. In some implementations, when the fifth hash value and the fourth hash value are not equivalent, the network device 105 may repeat processing the OEM bootloader signature to calculate an additional hash value until the additional hash value and the fourth hash value are equivalent. Accordingly, the network device 105 may complete the boot process for the network device 105 when the additional hash value and the fourth hash value are equivalent or may cease the boot process for the network device 105 when the additional hash value and the fourth hash value are not equivalent.

In some implementations (e.g. after the network device 105 has completed the boot process), an additional OEM server device 110-2 may be added to the one or more OEM server devices 110-2 and the additional OEM server device 110-2 may send to the network device 105 an additional OEM bootloader application, an additional OEM bootloader signature, and/or an additional OEM public key. The network device 105 may store the additional OEM bootloader application, the additional OEM bootloader signature, and/or the additional OEM public key in the memory of the network device 105. In some implementations, the additional OEM server device 110-2 may send a message to the network device 105 indicating that the additional bootloader application (e.g., additional OEM firmware) is to be added for the network device 105. Accordingly, based on the message, the network device 105 may update the provider bootloader application to add the additional OEM public key to the one or more OEM public keys included in the provider bootloader application, and the network device 105 may use the provider bootloader application to attempt to load the additional OEM bootloader application in a similar manner to that described herein in relation to FIGS. 1L-1N.

Additionally, or alternatively, when an additional OEM server device 110-2 is added to the one or more OEM server devices 110-2, the additional OEM server device 110-2 may send to the provider server device 110-1 an additional OEM public key. The provider server device 110-1 may generate a new provider bootloader application that includes the one or more OEM public keys and the additional OEM public key, may sign the new provider bootloader application with the provider private key to generate a new provider bootloader signature, and may send the provider public key, the new provider bootloader application, and the new provider bootloader signature to the one or more one or more OEM server devices 110-2 (including the additional OEM server device 110-2) in a similar manner to that described herein in relation to FIGS. 1B-1F. The additional OEM server device 110-2 may generate and sign an additional OEM bootloader application with an additional OEM private key to generate an additional OEM bootloader signature and may send, to the network device 105, the new provider bootloader application, the new provider bootloader signature, the additional OEM bootloader application, and the additional OEM bootloader signature in a similar manner to that described herein in relation to FIGS. 1F-1G.

The network device 105 may execute the boot ROM application to load the new provider bootloader application from the memory of the network device and may verify (e.g., based on the new provider bootloader signature) that the new provider bootloader application is authorized to run on the network device 105 in a similar manner to that described herein in relation to FIGS. 1I-1K. The network device 105 may utilize the new provider bootloader application to load the additional OEM bootloader application, may verify (e.g., based on the additional OEM bootloader signature) that the additional OEM bootloader application is authorized to run on the network device 105, and may attempt to load the additional OEM bootloader application in a similar manner to that described herein in relation to FIGS. 1L-1N.

As indicated above, FIGS. 1A-1N are provided as an example. Other examples may differ from what is described with regard to FIGS. 1A-1N. The number and arrangement of devices shown in FIGS. 1A-1N are provided as an example. In practice, there may be additional devices, fewer devices, different devices, or differently arranged devices than those shown in FIGS. 1A-1N. Furthermore, two or more devices shown in FIGS. 1A-1N may be implemented within a single device, or a single device shown in FIGS. 1A-1N may be implemented as multiple, distributed devices. Additionally, or alternatively, a set of devices (e.g., one or more devices) shown in FIGS. 1A-1N may perform one or more functions described as being performed by another set of devices shown in FIGS. 1A-1N.

Figure 2:
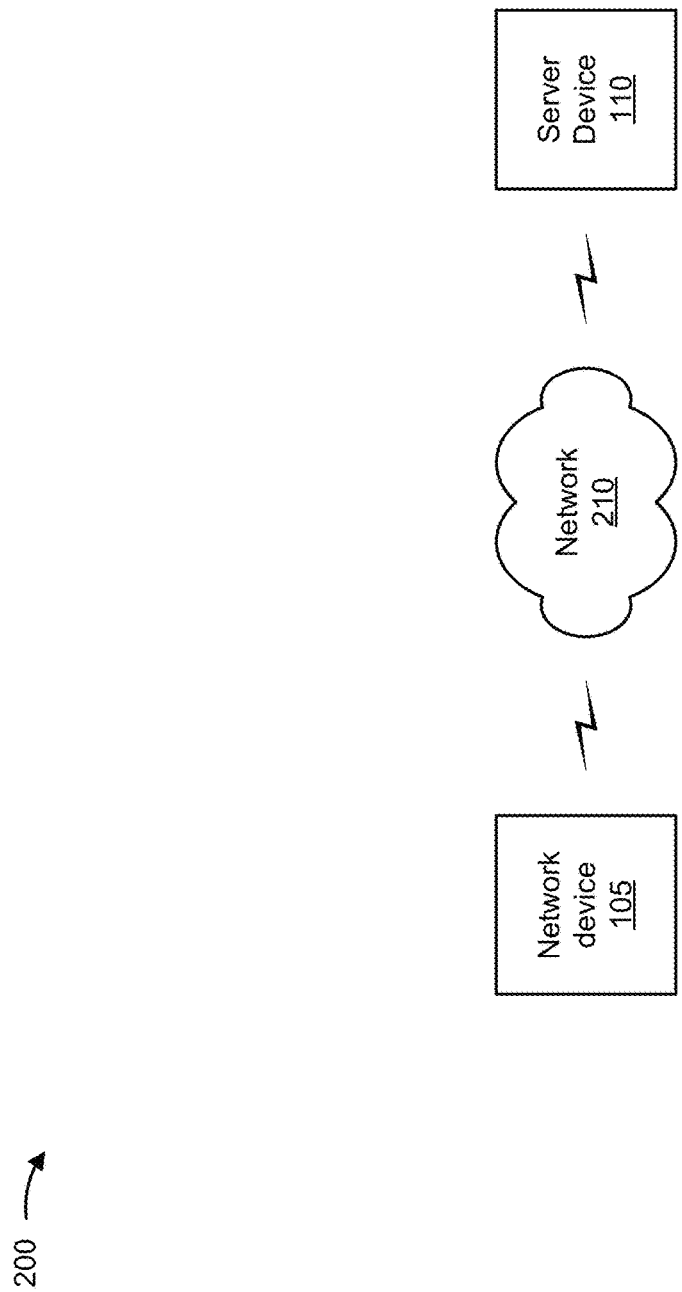
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include the network device 105, the server device (e.g., provider server device 110-1, OEM server device 110-2, and/or the like), and/or a network 210. Devices of environment 200 may interconnect via wired connections, wireless connections, or a combination of wired and wireless connections.

The network device 105 includes one or more devices capable of receiving, processing, storing, routing, and/or providing traffic (e.g., a packet, other information or metadata, and/or the like) in a manner described herein. For example, the network device 105 may include a router, such as a label switching router (LSR), a label edge router (LER), an ingress router, an egress router, a provider router (e.g., a provider edge router, a provider core router, and/or the like), a virtual router, and/or the like. Additionally, or alternatively, the network device 105 may include a gateway, a switch, a firewall, a hub, a bridge, a reverse proxy, a server (e.g., a proxy server, a cloud server, a data center server, and/or the like), a load balancer, and/or a similar device. In some implementations, the network device 105 may be a physical device implemented within a housing, such as a chassis. In some implementations, the network device 105 may be a virtual device implemented by one or more computing devices of a cloud computing environment or a data center. In some implementations, a group of network devices 105 may be a group of data center nodes that are used to route traffic flow through a network.

The server device 110 includes one or more devices capable of receiving, generating, storing, processing, providing, and/or routing information, as described elsewhere herein. The server device 110 may include a communication device and/or a computing device. For example, the server device 110 may include a server, an application server, a client server, a web server, a database server, a host server, a proxy server, a virtual server (e.g., executing on computing hardware), a server in a cloud computing system, a device that includes computing hardware used in a cloud computing environment, or a similar type of device. The server device 110 may communicate with one or more other devices of environment 200, as described elsewhere herein.

The network 210 includes one or more wired and/or wireless networks. For example, the network 210 may include a cellular network (e.g., a fifth generation (5G) network, a fourth generation (4G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or the like, and/or a combination of these or other types of networks. The network 210 enables communication among the devices of environment 200.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
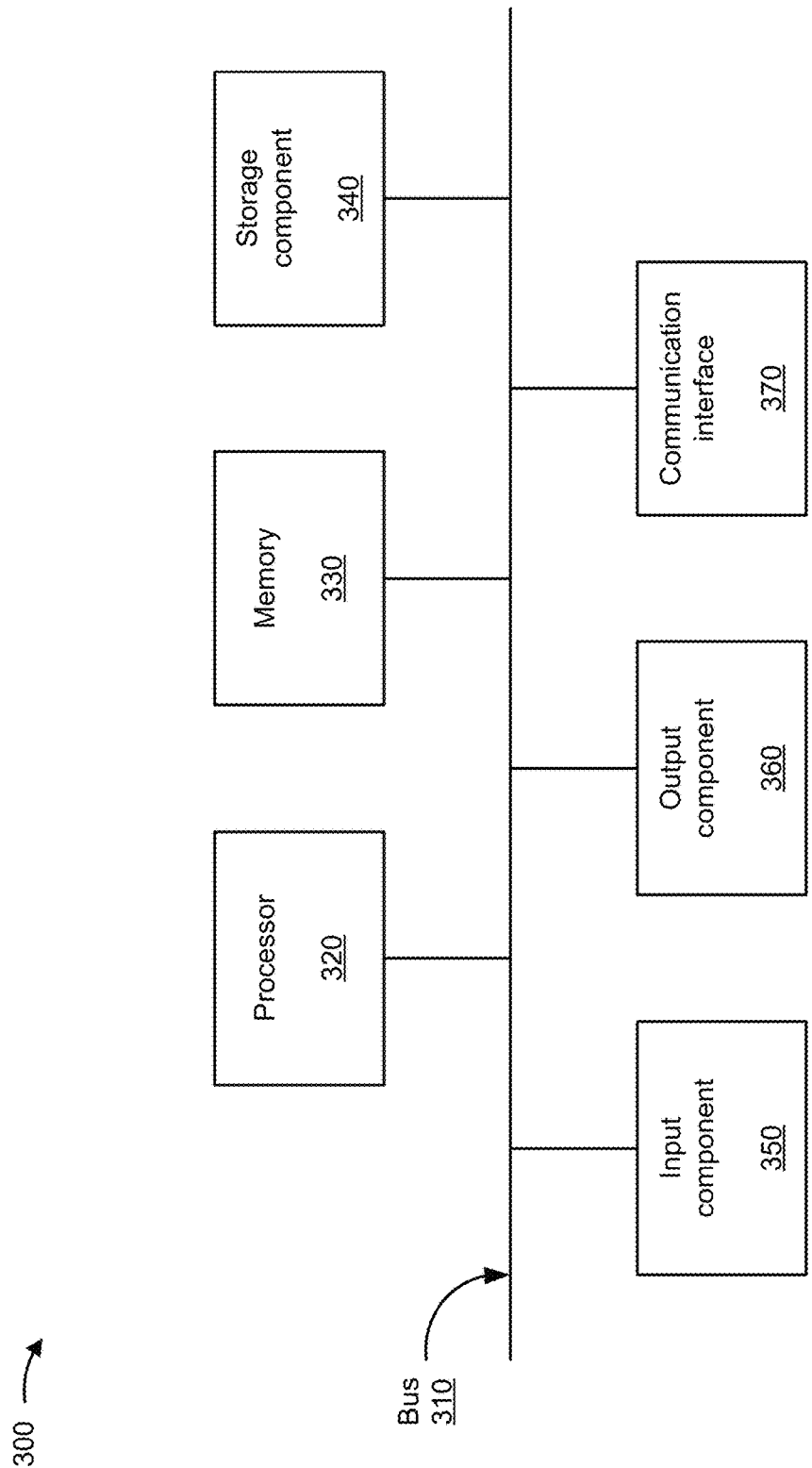
FIG. 3 is a diagram of example components of one or more devices of FIG. 2.

FIG. 3 is a diagram of example components of a device 300, which may correspond to network device 105 and/or server device 110. In some implementations, network device 105 and/or server device 110 may include one or more devices 300 and/or one or more components of device 300. As shown in FIG. 3, device 300 may include a bus 310, a processor 320, a memory 330, a storage component 340, an input component 350, an output component 360, and a communication component 370.

Bus 310 includes a component that enables wired and/or wireless communication among the components of device 300. Processor 320 includes a central processing unit, a graphics processing unit, a microprocessor, a controller, a microcontroller, a digital signal processor, a field-programmable gate array, an application-specific integrated circuit, and/or another type of processing component. Processor 320 is implemented in hardware, firmware, or a combination of hardware and software. In some implementations, processor 320 includes one or more processors capable of being programmed to perform a function. Memory 330 includes a random access memory), a read only memory, and/or another type of memory (e.g., a flash memory, a magnetic memory, and/or an optical memory).

Storage component 340 stores information and/or software related to the operation of device 300. For example, storage component 340 may include a hard disk drive, a magnetic disk drive, an optical disk drive, a solid state disk drive, a compact disc, a digital versatile disc, and/or another type of non-transitory computer-readable medium. Input component 350 enables device 300 to receive input, such as user input and/or sensed inputs. For example, input component 350 may include a touch screen, a keyboard, a keypad, a mouse, a button, a microphone, a switch, a sensor, a global positioning system component, an accelerometer, a gyroscope, an actuator, and/or the like. Output component 360 enables device 300 to provide output, such as via a display, a speaker, and/or one or more light-emitting diodes. Communication component 370 enables device 300 to communicate with other devices, such as via a wired connection and/or a wireless connection. For example, communication component 370 may include a receiver, a transmitter, a transceiver, a modem, a network interface card, an antenna, and/or the like.

Device 300 may perform one or more processes described herein. For example, a non-transitory computer-readable medium (e.g., memory 330 and/or storage component 340) may store a set of instructions (e.g., one or more instructions, code, software code, program code, and/or the like) for execution by processor 320. Processor 320 may execute the set of instructions to perform one or more processes described herein. In some implementations, execution of the set of instructions, by one or more processors 320, causes the one or more processors 320 and/or the device 300 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 3 are provided as an example. Device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
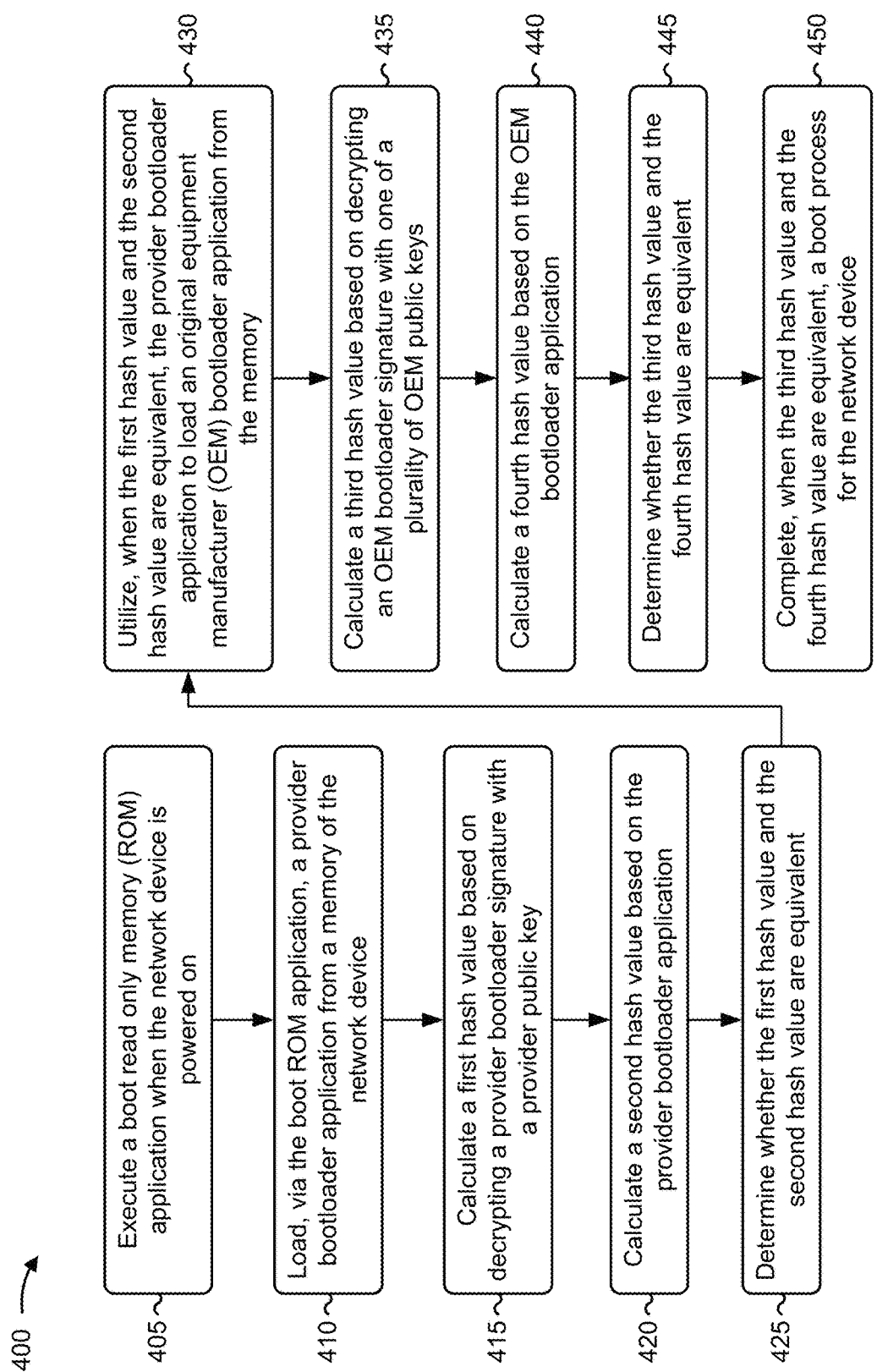
FIG. 4 is a flow chart of an example process relating to securely booting a network device with a service provider trust anchor.

FIG. 4 is a flow chart of an example process 400 associated with booting a network device with a service provider trust anchor. In some implementations, one or more process blocks of FIG. 4 may be performed by a network device (e.g., network device 105). In some implementations, one or more process blocks of FIG. 4 may be performed by another device or a group of devices separate from or including the network device, such as a server device (e.g., server device 110), and/or the like. Additionally, or alternatively, one or more process blocks of FIG. 4 may be performed by one or more components of a device 300, such as processor 320, memory 330, storage component 340, input component 350, output component 360, communication component 370, and/or the like.

As shown in FIG. 4, process 400 may include executing a boot read only memory (ROM) application when the network device is powered on (block 405). For example, the network device may execute a boot read only memory (ROM) application when the network device is powered on, as described above.

As further shown in FIG. 4, process 400 may include loading, via the boot ROM application, a provider bootloader application from a memory of the network device (block 410). For example, the network device may load, via the boot ROM application, a provider bootloader application from a memory of the network device, as described above.

As further shown in FIG. 4, process 400 may include calculating a first hash value based on decrypting a provider bootloader signature with a provider public key (block 415). For example, the network device may calculate a first hash value based on decrypting a provider bootloader signature with a provider public key, as described above. The provider bootloader signature may be generated based on signing provider bootloader application with a provider private key.

As further shown in FIG. 4, process 400 may include calculating a second hash value based on the provider bootloader application (block 420). For example, the network device may calculate a second hash value based on the provider bootloader application, as described above.

As further shown in FIG. 4, process 400 may include determining whether the first hash value and the second hash value are equivalent (block 425). For example, the network device may determine whether the first hash value and the second hash value are equivalent, as described above.

As further shown in FIG. 4, process 400 may include utilizing, when the first hash value and the second hash value are equivalent, the provider bootloader application to load an original equipment manufacturer (OEM) bootloader application from the memory (block 430). For example, the network device may utilize, when the first hash value and the second hash value are equivalent, the provider bootloader application to load an OEM bootloader application from the memory, as described above. Additionally, or alternatively, process 400 may include ceasing a boot process for the network device when the first hash value and the second hash value are not equivalent and/or generating an error message when the first hash value and the second hash value are not equivalent.

As further shown in FIG. 4, process 400 may include calculating a third hash value based on decrypting an OEM bootloader signature with one of a plurality of OEM public keys (block 435). For example, the network device may calculate a third hash value based on decrypting an OEM bootloader signature with one of a plurality of OEM public keys, as described above. The OEM bootloader signature may be generated based on signing OEM bootloader application with an OEM private key.

As further shown in FIG. 4, process 400 may include calculating a fourth hash value based on the OEM bootloader application (block 440). For example, the network device may calculate a fourth hash value based on the OEM bootloader application, as described above.

As further shown in FIG. 4, process 400 may include determining whether the third hash value and the fourth hash value are equivalent (block 445). For example, the network device may determine whether the third hash value and the fourth hash value are equivalent, as described above.

As further shown in FIG. 4, process 400 may include completing, when the third hash value and the fourth hash value are equivalent, a boot process for the network device (block 450). For example, the network device may complete, when the third hash value and the fourth hash value are equivalent, a boot process for the network device, as described above. In some implementations, completing the boot process for the network device comprises initializing components of the network device, installing firmware for an application of the network device, and/or the like. Additionally, or alternatively, process 400 includes ceasing the boot process for the network device when the third hash value and the fourth hash value are not equivalent.

In some implementations, process 400 includes receiving the provider bootloader application, the OEM bootloader application, the provider bootloader signature, and the OEM bootloader signature; storing the provider bootloader application, the OEM bootloader application, the provider bootloader signature, and the OEM bootloader signature in the memory; receiving the provider public key and the boot ROM application; and storing the provider public key and the boot ROM application in a chipset of the network device.

In some implementations, process 400 includes receiving a new provider bootloader application and an additional OEM bootloader application; loading, via the boot ROM application, the new provider bootloader application; utilizing the new provider bootloader application to load the additional OEM bootloader application; and completing, using the additional OEM bootloader application, an additional boot process for the network device.

In some implementations, process 400 includes calculating, when the third hash value and the fourth hash value are not equivalent, a fifth hash value based on decrypting the OEM bootloader signature with another one of the plurality of OEM public keys; determining whether the fifth hash value and the fourth hash value are equivalent; and completing the boot process for the network device when the fifth hash value and the fourth hash value are equivalent. Process 400 may also include ceasing the boot process for the network device when the fifth hash value and the fourth hash value are not equivalent.

In some implementations, process 400 includes storing the provider bootloader application, the OEM bootloader application, the provider bootloader signature, and the OEM bootloader signature in a memory of the network device and/or storing the provider public key and the boot ROM application in a chipset of the network device.

In some implementations, process 400 includes generating an error message when the first hash value and the second hash value are not equivalent.

In some implementations, process 400 includes calculating, when the third hash value and the fourth hash value are not equivalent, another hash value based on decrypting the OEM bootloader signature with another one of the plurality of OEM public keys; repeating the calculating of the other hash value until the other hash value and the fourth hash value are equivalent; and completing the boot process for the network device when the other hash value and the fourth hash value are equivalent.

In some implementations, the network device supports applications and firmware provided by OEMs associated with the plurality of OEM public keys.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
   executing, by a network device, a boot read only memory (ROM) application when the network device is powered on;
   loading, by the network device and via the boot ROM application, a provider bootloader application from a memory of the network device,
      wherein the provider bootloader application is associated with a provider and includes a plurality of public keys,
      wherein the provider corresponds to an entity that provides the network device to a network service provider associated with the network device, and
      wherein the plurality of public keys is associated with a group of original equipment manufacturers (OEMs) and the group of OEMs are manufacturers of a group of components included in the network device;
   calculating, by the network device, a first hash value based on decrypting a provider bootloader signature with a provider public key;
   calculating, by the network device, a second hash value based on the provider bootloader application;
   determining, by the network device, whether the first hash value and the second hash value are equivalent;
   utilizing, by the network device and when the first hash value and the second hash value are equivalent, the provider bootloader application to load an OEM bootloader application from the memory;
   calculating, by the network device, a third hash value based on decrypting an OEM bootloader signature with one of the plurality of public keys;
   calculating, by the network device, a fourth hash value based on the OEM bootloader application;
   determining, by the network device, whether the third hash value and the fourth hash value are equivalent; and
   completing, by the network device and when the third hash value and the fourth hash value are equivalent, a boot process for the network device.

2. The method of claim 1, further comprising:
   receiving the provider bootloader application, the OEM bootloader application, the provider bootloader signature, and the OEM bootloader signature;
   storing the provider bootloader application, the OEM bootloader application, the provider bootloader signature, and the OEM bootloader signature in the memory;
   receiving the provider public key and the boot ROM application; and
   storing the provider public key and the boot ROM application in a one-time-programmable memory in a chipset of the network device.

3. The method of claim 1, further comprising:
   receiving a new provider bootloader application and an additional OEM bootloader application;
   loading, via the boot ROM application, the new provider bootloader application;
   utilizing the new provider bootloader application to load the additional OEM bootloader application; and
   completing, using the additional OEM bootloader application, an additional boot process for the network device.

4. The method of claim 1, further comprising:
   calculating, when the third hash value and the fourth hash value are not equivalent, a fifth hash value based on decrypting the OEM bootloader signature with another one of the plurality of public keys;
   determining whether the fifth hash value and the fourth hash value are equivalent; and
   completing the boot process for the network device when the fifth hash value and the fourth hash value are equivalent.

5. The method of claim 4, further comprising:
   ceasing the boot process for the network device when the fifth hash value and the fourth hash value are not equivalent.

6. The method of claim 1, further comprising:
   ceasing the boot process for the network device when the third hash value and the fourth hash value are not equivalent.

7. The method of claim 1, wherein completing the boot process for the network device comprises one or more of:
   initializing components of the network device; or
   installing firmware for an application of the network device.

8. A network device, comprising:
   one or more processors configured to:
      execute a boot read only memory (ROM) application when the network device is powered on;
      load, via the boot ROM application, a first bootloader application from a memory of the network device,
         wherein the first bootloader application is associated with a provider and includes a plurality of public keys, wherein the provider corresponds to an entity that provides the network device to a network service provider associated with the network device; and wherein the plurality of public keys is associated with a group of original equipment manufacturers (OEMs) and the group of OEMs are manufacturers of a group of components included in the network device;

calculate a first hash value based on decrypting a first bootloader signature with a first public key;

calculate a second hash value based on the first bootloader application;

determine whether the first hash value and the second hash value are equivalent;

cease a boot process for the network device when the first hash value and the second hash value are not equivalent;

utilize, when the first hash value and the second hash value are equivalent, the first bootloader application to load a second bootloader application from the memory;

calculate a third hash value based on decrypting a second bootloader signature with one of the plurality of public keys;

calculate a fourth hash value based on the second bootloader application;

determine whether the third hash value and the fourth hash value are equivalent; and complete the boot process for the network device when the third hash value and the fourth hash value are equivalent.

9. The network device of claim 8, wherein the one or more processors are further configured to:

generate an error message when the first hash value and the second hash value are not equivalent.

10. The network device of claim 8, wherein the one or more processors are further configured to:

calculate, when the third hash value and the fourth hash value are not equivalent, another hash value based on decrypting the second bootloader signature with another one of the plurality of public keys;

repeat the calculating of the other hash value until the other hash value and the fourth hash value are equivalent; and complete the boot process for the network device when the other hash value and the fourth hash value are equivalent.

11. The network device of claim 8, wherein the one or more processors are further configured to:

cease the boot process for the network device when the first hash value and the second hash value are not equivalent.

12. The network device of claim 8, wherein the first bootloader signature is generated based on signing the first bootloader application with a first private key.

13. The network device of claim 8, wherein the second bootloader signature is generated based on signing the second bootloader application with a second private key.

14. The network device of claim 8, wherein the network device supports applications and firmware provided by the group of OEMs associated with the plurality of public keys.

15. A non-transitory computer-readable medium storing instructions, the instructions comprising:

one or more instructions that, when executed by one or more processors of a network device, cause the one or more processors to:

store a provider bootloader application, an original equipment manufacturer (OEM) bootloader application, a provider bootloader signature, and an OEM bootloader signature in a memory of the network device, wherein the provider bootloader application is associated with a provider and includes a plurality of public keys, wherein the provider corresponds to an entity that provides the network device to a network service provider associated with the network device, and wherein the plurality of public keys is associated with a group of original equipment manufacturers (OEMs) and the group of OEMs are manufacturers of a group of components included in the network device;

store a provider public key and a boot read only memory (ROM) application in a chipset of the network device;

execute the boot ROM application when the network device is powered on;

load, via the boot ROM application, the provider bootloader application from the memory;

calculate a first hash value based on decrypting the provider bootloader signature with the provider public key;

calculate a second hash value based on the provider bootloader application;

determine whether the first hash value and the second hash value are equivalent;

utilize, when the first hash value and the second hash value are equivalent, the provider bootloader application to load the OEM bootloader application from the memory;

calculate a third hash value based on decrypting the OEM bootloader signature with one of the plurality of public keys;

calculate a fourth hash value based on the OEM bootloader application;

determine whether the third hash value and the fourth hash value are equivalent; and complete a boot process for the network device when the third hash value and the fourth hash value are equivalent.

16. The non-transitory computer-readable medium of claim 15, wherein the one or more instructions, when executed by the one or more processors, further cause the one or more processors to:

cease the boot process for the network device when the first hash value and the second hash value are not equivalent; and generate an error message when the first hash value and the second hash value are not equivalent.

17. The non-transitory computer-readable medium of claim 15, wherein the one or more instructions, when executed by the one or more processors, further cause the one or more processors to:

calculate, when the third hash value and the fourth hash value are not equivalent, a fifth hash value based on decrypting the OEM bootloader signature with another one of the plurality of public keys;

determine whether the fifth hash value and the fourth hash value are equivalent; and selectively:

complete the boot process for the network device when the fifth hash value and the fourth hash value are equivalent, or cease the boot process for the network device when the fifth hash value and the fourth hash value are not equivalent.

18. The non-transitory computer-readable medium of claim 15, wherein the one or more instructions, that cause the one or more processors to complete the boot process for the network device, cause the one or more processors to one or more of:

initialize components of the network device; or install firmware for an application of the network device.

19. The non-transitory computer-readable medium of claim 15, wherein the one or more instructions, when executed by the one or more processors, further cause the one or more processors to:

receive a new provider bootloader application and an additional OEM bootloader application; and complete, based on the new provider bootloader application and the additional OEM bootloader application, an additional boot process for the network device.

20. The non-transitory computer-readable medium of claim 15, wherein the one or more instructions, when executed by the one or more processors, further cause the one or more processors to:

calculate, when the third hash value and the fourth hash value are not equivalent, another hash value based on decrypting the OEM bootloader signature with another one of the plurality of public keys;

repeat the calculating of the other hash value until the other hash value and the fourth hash value are equivalent; and complete the boot process for the network device when the other hash value and the fourth hash value are equivalent.

* * * * *